United States Patent [19]

Takai

[11] Patent Number: 4,840,039

[45] Date of Patent: Jun. 20, 1989

[54] AUTOMATIC EXPANSION VALVE FOR A REFRIGERATION CIRCUIT

[75] Inventor: Kazuhiko Takai, Gunma, Japan

[73] Assignee: Sanden Corporation, Gunma, Japan

[21] Appl. No.: 171,392

[22] Filed: Mar. 21, 1988

[30] Foreign Application Priority Data

Mar. 20, 1987 [JP] Japan ............................. 87-41584[U]

[51] Int. Cl.⁴ .............................................. B60H 1/32
[52] U.S. Cl. ...................................... 62/244; 62/180; 62/204
[58] Field of Search ................ 62/222, 223, 211, 204, 62/180, 244

[56] References Cited

U.S. PATENT DOCUMENTS

| | | | |
|---|---|---|---|
| 1,984,054 | 12/1934 | Carraway | 62/222 X |
| 3,121,315 | 2/1964 | Matthies | 62/180 |
| 3,462,965 | 5/1969 | Miner | 62/180 |
| 3,786,651 | 1/1974 | Eschbaugh et al. | 62/222 |

*Primary Examiner*—William E. Tapolcai
*Attorney, Agent, or Firm*—Banner, Birch, McKie & Beckett

[57] ABSTRACT

An automotive air conditioning system having a refrigeration circuit including a compressor, a condenser, an expansion valve, an evaporator, and an accumulator disposed serially and respectively is disclosed. A fan controls the air flow volume of the evaporator in accordance with the operation of a transfer switch. The expansion valve includes two orifices and an actuator which opens and closes one orifice. The actuator is electrically controlled in response to the operation of the transfer switch. The transfer swith correspondingly controls both the air flow across the evaporator and the refrigerant flow through the expansion valve. Therefore, an accumulator having a small volume can be used the expansion valve construction is simple.

10 Claims, 3 Drawing Sheets

AUTOMATIC EXPANSION VALVE FOR A REFRIGERATION CIRCUIT

TECHNICAL FIELD

The present invention relates to a refrigeration circuit for an automotive air conditioning system. More particularly, the present invention relates to an automatic expansion valve for a refrigeration circuit for an automotive air conditioning system.

BACKGROUND OF THE INVENTION

A conventional refrigerant circuit includes compressor 1, condenser 2, expansion valve 3, evaporator 4, and accumulator 5 connected serially as shown in FIG. 1. Evaporator 4 is provided with fan 6 having motor 6a which rotates fan 6. The air flow volume of fan 6 is varied by transfer switch 7.

FIG. 2 shows the construction of transfer switch 7. Transfer switch 7 includes movable contact point 71, fixed contact point 72 which is connected to electric source 8, and fixed contact points 73, 74, and 75, which are each connected to motor 6a of fan 6. Fixed contact point 73 is coupled to motor 6a through resistors R1 and R2 which are connected in series. Fixed contact point 74 is coupled to motor 6a through resistor R2. Fixed contact point 75 is connected directly to motor 6a. Movable contact point 71 moves on fixed contact points 72, 73, 74, and 75 to vary the fan speed. When fixed contact point 73 is coupled to fixed contact point 72 through movable contact point 71, because the resistance between motor 6a and fixed contact point 73 is large, the electric current flowing to motor 6a is small and motor 6a rotates at its lowest speed. Accordingly, the air flow volume of fan 6 is the smallest. When fixed contact point 74 is coupled to fixed contact point 72 through movable contact point 71, the resistance between motor 6a and fixed contact point 73 is smaller. The amount of electric current increases and motor 6a rotates at a higher rotational speed. Accordingly, the air flow volume of fan 6 also increases. When fixed contact point 75 is coupled to fixed contact point 72 through movable contact point 71, the resistance between motor 6a and fixed contact point 75 is at a minimum. The amount of electric current is largest, motor 6a rotates at its highest speed, and the air flow volume of fan 6 is a maximum.

Expansion valve 3, shown in FIG. 3, has orifice 33 having a uniform cross-sectional area, high pressure side 31, and low pressure side 32. The cross-sectional area of orifice 33 must be large enough to accommodate the refrigerant flow volume when the air conditioning load is greatest. Accordingly, when the air flow volume of fan 6 is reduced and evaporator 4 operates at a reduced capacity, excess refrigerant accumulates at low pressure side 32 of valve 3 in the refrigerant circuit. To prevent this, the volume of accumulator 5 must be increased to house excess refrigerant and to prevent excess refrigerant from remaining at low pressure side 32 of valve 3. However, if the volume of accumulator 5 is increased, the space for housing accumulator 5 must be increased. This increases the space in the engine compartment required for the refrigeration circuit and is highly disadvantageous as such increased space may not be available.

Another cnoventional expansion valve is disclosed in allowed Japanese Utility Model No. 59-21,938. The cross-sectional area of the opening of this expansion valve can be varied by using the negative pressure of the engine. However, this expansion valve has a complicated construction and is expensive to produce.

SUMMARY OF THE INVENTION

It is a primary object of the present invention to provide a refrigeration circuit having a small accumulator.

It is another object of the present invention to provide a refrigeration circuit including an automatic expansion valve having an orifice with a controllable effective cross-sectional area and having a simple construction.

An automotive air conditioning system according to the present invention has a refrigeration circuit which includes a compressor, a condenser, an expansion valve, an evaporator, and an accumulator. Dishcarged refrigerant from the comopressor passes through the condenser, the expansion valve, the evaporator, and the accumulator, respectively, and returns to an inlet of the compressor. A fan controls the air flow volume as regulated by a transfer switch. The expansion valve includes two orifices and an actuator which controls the opening and closing of one orifice. The actuator is electrically controlled in response to the operation of the transfer switch.

Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

DETAILED DESCRIPTION OF PREFERRED EMBODIMENTS

Figure 1:
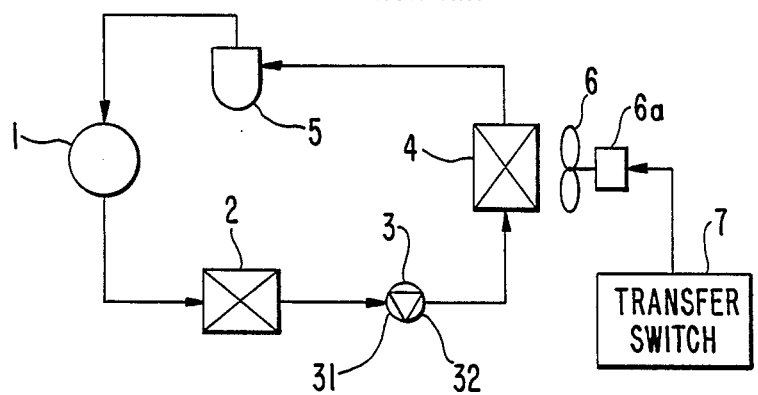
FIG. 1 is a schematic view illustrating a conventional refrigeraton circuirt.
Figure 2:
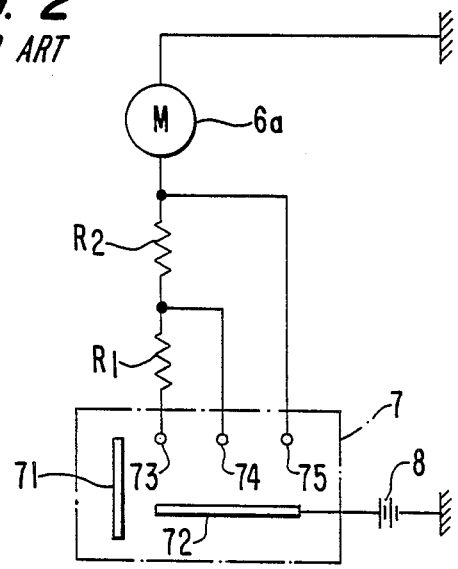
FIG. 2 is a circuit diagram illustrating the transfer switch of FIG. 1.
Figure 3:
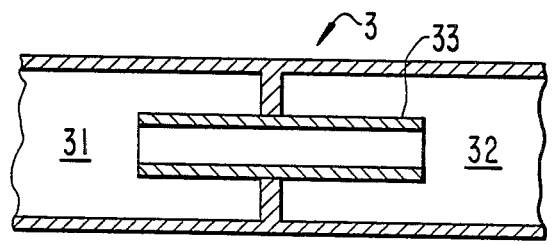
FIG. 3 is a cross-sectional view illustrating the expansion valve of FIG. 1.

FIGS. 4-8 illustrate the present invention. Numerals in these figures identical to numerals in FIGS. 1-3 indicate identical elements. The description of these elements is omitted here.

Figure 4:
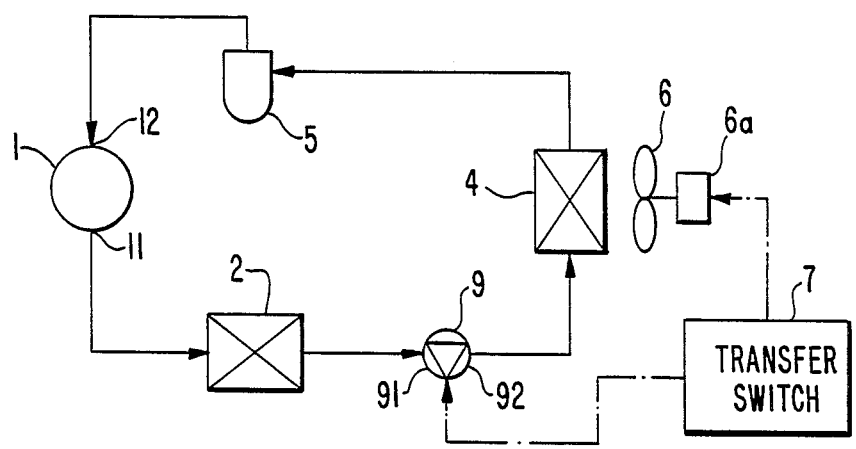
FIG. 4 is a schematic view illustrating a refrigeration circuit in accordance with one embodiment of this invention.

FIG. 4 shows a refrigeration circuit for an automotive air conditioning system including an automatic expansion valve in accordance with one embodiment of this invention. The refrigeration circuit includes compressor 1 having outlet port 11 and inlet port 12, condenser 2, automatic expansion valve 9, evaporator 4, and accumulator 5, connected in series. Transfer switch 7 is connected to motor 6a of fan 6 and automatic expansion valve 9 to control the operation of motor 6a and automatic expansion valve 9. Compressor 1 is driven by an engine and circulates refrigerant in the circuit.

Figure 5:
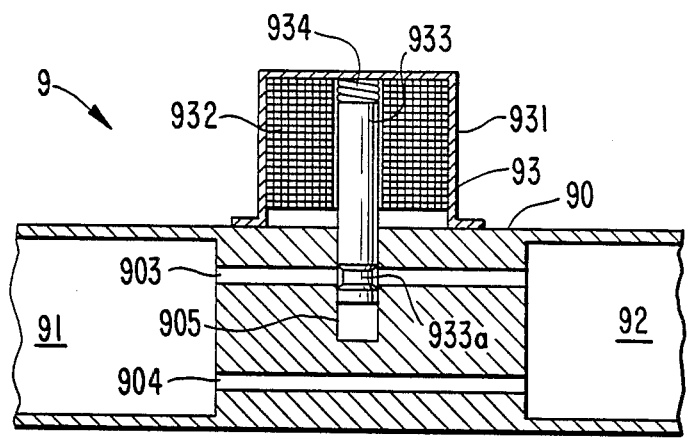
FIG. 5 is a cross-sectional view of the automatic expansion valve of FIG. 4 with orifice 903 open.
Figure 6:
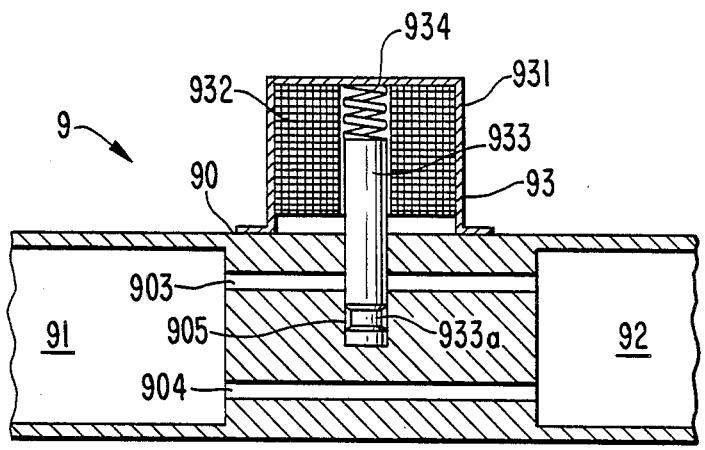
FIG. 6 is a cross-sectional view of the automatic expansioin valve of FIG. 4 with orifice 903 closed.

FIGS. 5 and 6 show the construction of automatic expansion valve 9. Automatic expansion valve 9 includes body portion 90 having passageways or orifices 903 and 904. Orifices 903 and 904 provide fluid communication between high pressure side 91 and low pressure side 92 of automatic expansion valve 9. Orifice 904 is always open. Orifice 903 is closable by a valve. Orifice 903 is connected to aperture 905 formed in body portion 90. Aperture 905 extends through the interior of body portion 90 and is perpendicular to orifice 903. Electromagnetic valve 93 is disposed on body portion 90. Electromagnetic valve 93 includes casing 931, electromagnet 932 disposed in casing 931, and valve element 933 which is surrounded by electromagnet 932. Valve element 933 is movable within aperture 905 and is urged toward the bottom of aperture 905 by coil spring 934 disposed between the inner end surface of casing 931 and the top of valve element 933. The diameter of valve element 933 is substantially equal to and slightly less than the diameter of aperture 905. Valve element 933 has a reduced diameter portion 933a near its bottom end.

When electromagnet 932 is not energized, as shown in FIG. 6, valve element 933 is urged to the bottom of aperture 905 by the recoil strength of coil spring 934. This obstructs communication between high pressure side 91 and low pressure side 92 through orifice 903. When electromagnet 932 is energized, its magnetic force attracts valve element 933 against the recoil strength of coil spring 934 as shown in FIG. 5. Accordingly, small diameter portion 933a of valve element 933 is aligned with orifice 903, providing communication through orifice 903 between high pressure side 91 and low pressure side 92.

The communication between high pressure side 91 and low pressure side 92 of automatic expansion valve 9 through orifice 903 is controlled by the opening and closing of valve element 933. Accordingly, when electromagnet 932 is energized, both orifices 903 and 904 communicate between high pressure side 91 and low pressure side 92. The effective cross-sectional area of the passageway between high pressure side 91 and low pressure side 92 is greatest. Contrarily, when electromagnet 932 is not energized, only orifice 904 communicates between high pressure side 91 and low pressure side 92. In this instance, the effective cross-sectional area of the passage is a minimum. Alternately, automatic expansion valve 9 may be formed with only one passageway and electromagnetic valve 93 variably controls the opening of this passageway.

Figure 7:
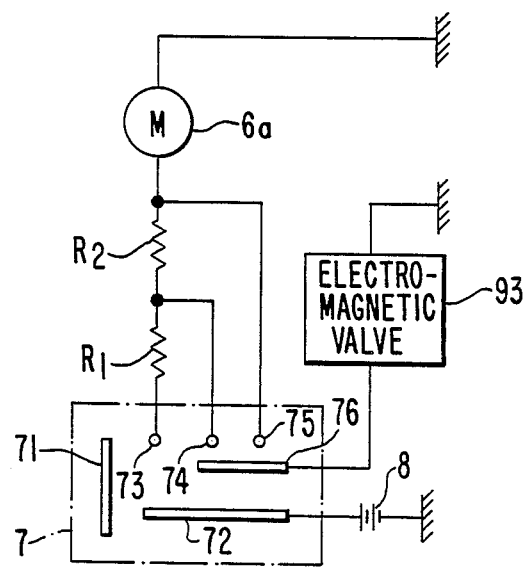
FIG. 7 is a circuit diagram illustrating the transfer switch for the automatic expansion valve of FIGS. 5 and 6.

Referring to FIG. 7, a circuit diagram of transfer switch 7 for controlling automatic expansion valve 9 is shown. Transfer switch 7 includes movable contact point or mode 71, which functions as a switch fixed contact point or mode 72 which is connected to electric source 8, fixed contact points or mode 73, 74, and 75 which are connected to motor 6a, and fixed contact point or mode 76 which is connected to electromagnetic valve 93. Fixed contact point 76 is disposed in a location corresponding to fixed contact points 74 and 75. Accordingly, when movable contact point 71 connects fixed contact point 72 to fixed contact points 74 or 75, fixed contact point 72 is also connected to fixed contact point 76, and electromagnetic valve 93 is energized. If fixed contact point 72 is connected to fixed contact point 73 through movable contact point 71, fixed contact point 72 is not connected to fixed contact point 76 and electromagnetic valve 93 is not energized. Thus, transfer switch 7 controls electromagnetic valve 93 as well as the air flow volume of fan 6.

The operation of transfer switch 7 which controls expansion valve 9 in accordance with a minimum, intermediate or maximum fan speed setting to attain the desired air conditioning, is as follows. When fixed contact point 75 is connected to fixed contact point 72 through movable contact point 71, motor 6a rotates at the highest rotational speed since no resistor lies between motor 6a and fixed contact point 75. Simultaneously, since fixed contact point 76 is also connected to fixed contact point 72, electromagnetic valve 93 is energized, allowing orifice 903 to communicate between high pressure side 91 and low pressure side 92 as shown in FIG. 5. Accordingly, the effective cross-sectional area of the passageway between high pressure side 91 and low pressure side 92—the combined cross-sectional areas of orifices 903 and 904—is maximized. Evaporator 4 operates at its largest capacity, corresponding to the maximum air flow volume of fan 6 so the air conditioning system operates at its largest capacity.

When fixed contact point 74 is connected to fixed contact point 72 through movable contact point 71, motor 6a rotates at a middle rotational or intermediate speed since one resistor is disposed between motor 6a and fixed contact point 74. Simultaneously, since fixed contact point 76 is also connected to fixed contact point 72, electromagnetic valve 93 is energized, allowing orifice 903 to communicate between high pressure side 91 and low pressure side 92. Accordingly, as discussed above, the capacity of evaporator 4 suitably corresponds to the volume of air flow volume of fan 6.

When fixed contact point 73 is connected to fixed contact point 72 through movable contact point 71, motor 6a rotates at the slowest rotational speed since two resistors lie between motor 6a and fixed contact point 73. In this mode, fixed contact point 76 is not connected to fixed contact point 72 through movable transfer contact point 71. Accordingly, electromagnetic valve 93 is not energized, and communication between high pressure side 91 and low pressure side 92 through orifice 903 is prevented by valve element 933 as shown in FIG. 6. Refrigerant flows from high pressure side 91 to low pressure side 92 through orifice 904 only. The effective cross-sectional area of the opening of the passageway is smallest, and the capacity of evaporator 4 corresponds to the volume of refrigerant flowing therethrough. Thus, because orifice 903 is closed, excess refrigerant does not accumulate at low pressure side 92, and an accumulator having a small volume may be used.

In the above embodiment, transfer switch 7 is set so when the air flow volume of fan 6 is at its largest or middle settings both orifices 903 and 904 are open, and when the air flow volume of fan 6 is smallest only orifice 904 is open. In an alternate embodiment as shown in FIG. 8, transfer switch 7 can be set so when the air flow volume of fan 6 is largest both orifices 903 and 904 are open, and when the air flow volume of fan 6 is at its middle or smallest settings only orifice 904 is open.

Figure 8:
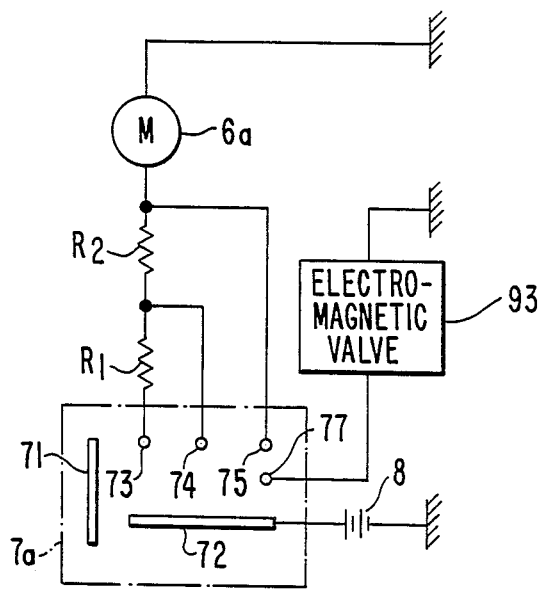
FIG. 8 is a circuit diagram illustrating an alternate embodiment of the transfer switch for the automatic expansion valve of FIGS. 5 and 6.

With reference to FIG. 8, a circuit diagram of this alternate transfer switch for controlling automatic expansion valve 9 is shown. In this embodiment, fixed contact point 77 replaces fixed contact point 76. Fixed contact point 77 is connected to electromagnetic valve 93 and corresponds only with fixed contact point 75. Accordingly, fixed contact point 77 is connected to fixed contact point 72 to energize electromagnetic valve 93 only when fixed contact point 72 is connected to fixed contact point 75 through movable contact point 71. Both orifices 903 and 904 are open in this mode only. When fixed contact point 72 is connected to fixed contact points 73 or 74 through movable contact point 71, fixed contact point 77 is not connected to fixed contact point 72, electromagnetic valve 93 is not energized, and only orifice 904 is open.

Numerous characteristics, advantages, and embodiments of the invention have been described in detail in the foregoing description with reference to the accompanying drawings. However, the disclosure is illustrative only and the invention is not limited to the precise illustrated embodiments. Various changes and modifications may be effected therein by one skilled in the art without departing from the scope or spirit of the invention.

I claim:

1. An automotive air conditioning system having a refrigeration circuit including a compressor, a condenser, an expansion valve, an evaporator, and an accumulator connected in series, a fan associated with said evaporator, and a transfer switch for regulating the speed of said fan to thereby control air flow volume across said evaporator, the improvement comprising:
    said expanison valve comprising a body portion having a passageway extending therethrough and actuator means for controlling the effective cross-sectional area of said passageway; and
    said transfer switch comprising control means for regulating the fan speed and simultaneously controlling said actuator means in accordance with fan speed so that the effective cross-sectional area of said passageway may be changed simultaneously with regulation of fan speed.

2. The automotive air conditioning system according to claim 1 wherein said transfer switch control means includes contacts forming minimum, intermediate and maximum fan speed settings and switch means for switching from one of said settings to another to thereby regulate fan speed, wherein said transfer switch control means controls the energization of said actuator means to control the cross-sectional area of the opening of said passageway of said expansion valve in accordance with fan speed setting.

3. The automotive air conditioning system according to claim 2 wherein said transfer switch control means controls the energization of said actuator means to increase the effective cross-sectional area of the opening of said passageway when regulating said fan speed at a maximum and to reduce the effective cross-sectional area of the opening of said passageway when regulating said fan speed at a minimum.

4. The automotive air conditioning system according to claim 3 wherein said transfer switch control means controls the energization of said actuator means to maximize the effective cross-sectional area of the opening of said passageway when regulating said fan speed at its maximum or intermediate settings and to minimize the effective cross-sectional area of the opening of said passageway when regulating said fan speed at its minimum setting.

5. The automotive air conditioning system according to claim 3 wherein said transfer switch control means controls the energization of said actuator means to maximize the effective cross-sectional area of the opening of said passageway when regulating said fan speed at its maximum setting and to minimize the effective cross-sectional area of the opening of said passageway when regulating said fan speed at its intermediate or minimum settings.

6. The automotive air conditioning system of claim 1 wherein said transfer switch includes a first contact for connection with a power source, a second contact connected to said actuator means, and a plurality of other contacts connected to said fan, said control means further comprising switch means for simultaneously interconnecting said first, second and one of said plurality of other contacts when said switch means is in a first position, thereby interconnecting said fan and actuator means.

7. The automotive air conditioning system of claim 6 wherein said switch means disconnects said second contact from said one of said plurality of other contacts when said switch means is in a second position, thereby disconnecting said fan and actuator means.

8. An automotive air conditioning system having a refrigeration circuit including a compressor, a condenser, an expansion valve, an evaporator, and an accumulator connected in series, a fan associated with said evaporator, and a transfer switch for regulating the speed of said fan to thereby control air flow volume across said evaporator, the improvement comprising:
    said expansion valve comprises two orifices and an actuator, a first orifice providing continuous communication through said expansion valve and a second orifice providing controllable communication through said expansion valve;
    said actuator comprises an electromagnetic valve, said electromagnetic valve comprises an electromagnet and a valve element, and said valve element opens and closes said second orifice in accordance with the operation of said electromagnet as controlled by said transfer switch;
    wherein the said second orifice is open when the air flow volume of said fan is a maximum and said second orifice is closed when the air flow volume of said fan is a minimum.

9. An automotive air conditioning system having a refrigeration circuit including a compressor, a condenser, an expansion valve, an evaporator, and an accumulator connected in series, a fan associated with said evaporator, and a transfer switch for regulating the speed of said fan to thereby control air flow volume across said evaporator, the improvement comprising:
    said expansion valve comprising a body portion having a passageway and an actuator, said actuator comprising an electromagnetic valve having an electromagnet and a valve element, said valve element being associated with said passageway for controlling the effective cross-sectional area thereof in response to the state of energization of said electromagnet; and
    said transfer switch including means for controlling the energization of said electromagnet.

10. An automotive air conditioning system having a refrigeration circuit including a compressor, a condenser, an expansion valve, an evaporator, and an accumulator connected in series, a fan associated with said evaporator, and a transfer switch for regulating the speed of said fan to thereby control air flow volume across said evaporator, the improvement comprising:

said expansion valve comprising a body portion having first and second passageways and actuator means for opening and closing said second passageway, said first passageway providing continuous communication through said expansion valve; and said transfer switch including means for controlling said actuator means to control the effective cross-sectional area of said second passageway.

* * * * *